(12) United States Patent
Kaski

(10) Patent No.: US 11,479,159 B1
(45) Date of Patent: Oct. 25, 2022

(54) LOAD BINDING APPARATUS

(71) Applicant: Lars Kaski, Amboy, WA (US)

(72) Inventor: Lars Kaski, Amboy, WA (US)

( * ) Notice: Subject to any disclaimer, the term of this patent is extended or adjusted under 35 U.S.C. 154(b) by 75 days.

(21) Appl. No.: 17/073,527

(22) Filed: Oct. 19, 2020

Related U.S. Application Data

(60) Provisional application No. 62/916,642, filed on Oct. 17, 2019.

(51) Int. Cl.
 *B60P 7/08* (2006.01)
 *B60P 7/12* (2006.01)

(52) U.S. Cl.
 CPC .............. *B60P 7/0823* (2013.01); *B60P 7/12* (2013.01)

(58) Field of Classification Search
 CPC .............................. B60P 7/0838; B60P 7/0823
 USPC ......... 410/100, 10–12, 20, 21, 23, 103–106, 410/110, 116
 See application file for complete search history.

(56) References Cited

U.S. PATENT DOCUMENTS

| | | | | |
|---|---|---|---|---|
| 9,102,259 | B2* | 8/2015 | Brewster | F16G 11/12 |
| 9,453,557 | B2* | 9/2016 | Chou | F16G 11/12 |
| 9,669,753 | B1* | 6/2017 | Royt | B60P 7/0823 |
| 9,884,581 | B1* | 2/2018 | Royt | B60P 7/0838 |
| 11,305,684 | B1* | 4/2022 | Szeglin | B60P 7/0823 |
| 2017/0182927 | A1* | 6/2017 | Brewster | B60P 7/0823 |

* cited by examiner

*Primary Examiner* — D Glenn Dayoan
*Assistant Examiner* — Sunsurraye Westbrook
(74) *Attorney, Agent, or Firm* — Mark E. Beatty; Rylander & Associates P.C.

(57) ABSTRACT

A load binding apparatus includes an elongated first part slidingly engageable to an elongated second part, the first and second parts including internal races or journal bearings to receive and provide guidance and support for a tie bolt, a tie bolt extending between the elongated first and second parts through the races/journal bearings to engage a threaded aperture in order to selectively shorten or elongate the load binding apparatus to control tension, and chain couplers at opposed ends to couple to a binding chain.

6 Claims, 5 Drawing Sheets

LOAD BINDING APPARATUS

FIELD OF THE INVENTION

The present invention relates to high-strength adjustable load binders for transporting bulk loads such as logs, lumber, girders, scrap metal, sheet metal, and equipment such as construction equipment or other heavy loads, requiring chain or cable load binders.

BACKGROUND OF THE INVENTION

Transportation personnel require secure means to tie down heavy cargoes to truck and/or train trailer beds for shipment. Often these loads are bulky, odd-sized, have awkward dimensions, or comprise stacks of loose individual components such as logs, pipes, heavy equipment & etc. Personnel have to be able to easily engage the tie down system with one or two people, and in all kinds of weather. Ratcheting systems are available, but they often are not ideal. The ratchets impart a fixed displacement of chain, cable or strapping each cycle so can be difficult to optimize the tension level to a give size load. Ratchet systems using woven straps are subject to failure as the straps fray and may become dangerously brittle in cold weather. Geared systems also exist, but they are expensive and complicated, and require regular maintenance.

SUMMARY OF THE INVENTION

Thus, there is a need for a simple and reliable load binding apparatus to tie down bulky and variably sized and shaped loads, using readily available chains and cables, which has continuous adjustment to optimize tension to the load dimensions, can be installed by one or two operators with little training, does not require ongoing maintenance, and which is reliable in all weather conditions.

The load binding apparatus of the present invention includes an elongated first part slidingly engageable to an elongated second part, the first and second parts including internal races or journal bearings to receive and provide guidance and support for a tie bolt, a tie bolt extending between the elongated first and second parts through the races/journal bearings to engage a threaded aperture in order to selectively shorten or elongate the load binding apparatus to control tension, and chain couplers at opposed ends to couple to a binding chain.

The load biding apparatus described and claimed is rugged, with minimal moving parts, can utilize standard chains readily available, provides continuous adjustment using a threaded fastener, and can be installed, adjusted and removed by one or two people.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

REFERENCE NUMBERS USED IN DRAWINGS

Figure 1:
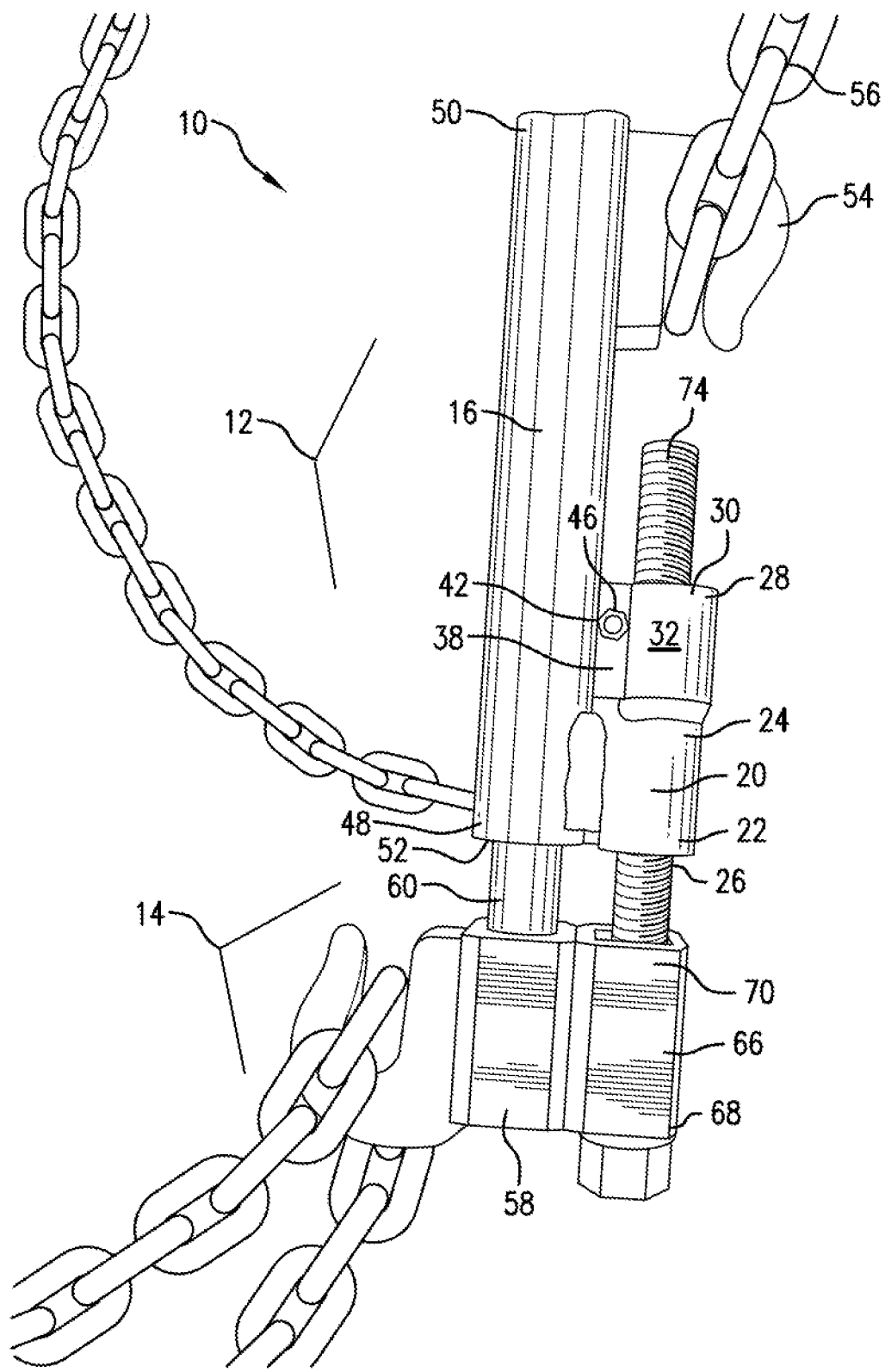
FIG. 1 shows a side view of a first embodiment coupled to a chain.

Turning now descriptively to the drawings, in which similar reference characters denote similar elements throughout the several views, the figures illustrate the of the present invention. With regard to the reference numerals used, the following numbering is used throughout the various drawing figures:

Number Description
10 First Embodiment
12 Load binder first part
14 Load binder second part
16 Load binder first part receiver portion
18 Load binder first part threaded coupler portion
20 Threaded coupler portion first journal bearing
22 First journal bearing first end
24 First journal bearing second end
26 First journal bearing interior race
28 Nut retainer
30 Threaded nut
32 Nut retainer first sidewall
34 Nut retainer second sidewall
36 Nut retainer end wall
38 Nut retainer first compression flange
40 Nut retainer second compression flange
42 First compression flange aperture
44 Second compression flange aperture
46 Nut retainer compression member
48 Load binder first part receiver portion first end
50 Load binder first part receiver portion second end
52 Load binder first part receiver portion interior race
54 First chain/cable coupler
56 Chain/cable/strap
58 Load binder second part head portion
60 Load binder second part guide rod
62 Load binder second part guide rod first end
64 Load binder second part guide rod second end
66 Load binder second part bolt receiver
68 Load binder second part bolt receiver first end
70 Load binder second part bolt receiver second end
72 Load binder second part bolt receiver interior chase
74 Threaded bolt
76 Second chain/cable coupler
110 Second Embodiment
112 Load binder first part
114 Load binder second part
116 Load binder first part receiver portion
118 <not used>
120 Receiver portion end flange aperture
122 Receiver portion end flange
124 <not used>
126 <not used>
128 <not used>
130 Threaded aperture
132 <not used>
134 <not used>
136 <notused>
138 Receiver portion end flange first retainer
140 Receiver portion end flange second retainer
142 Receiver portion end flange third retainer
144 <not used>
146 <notused>

148 Load binder first part receiver portion first end
150 Load binder first part receiver portion second end
152 <not used>
154 First chain/cable coupler
156 Chain/cable/strap
158 <not used>
160 <not used>
162 <not used>
164 <not used>
166 <not used>
168 Load binder second part first end
170 Load binder second part second end
172 Load binder second part receiver interior chase
174 Threaded bolt
176 Second chain/cable coupler
L Load

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 2:
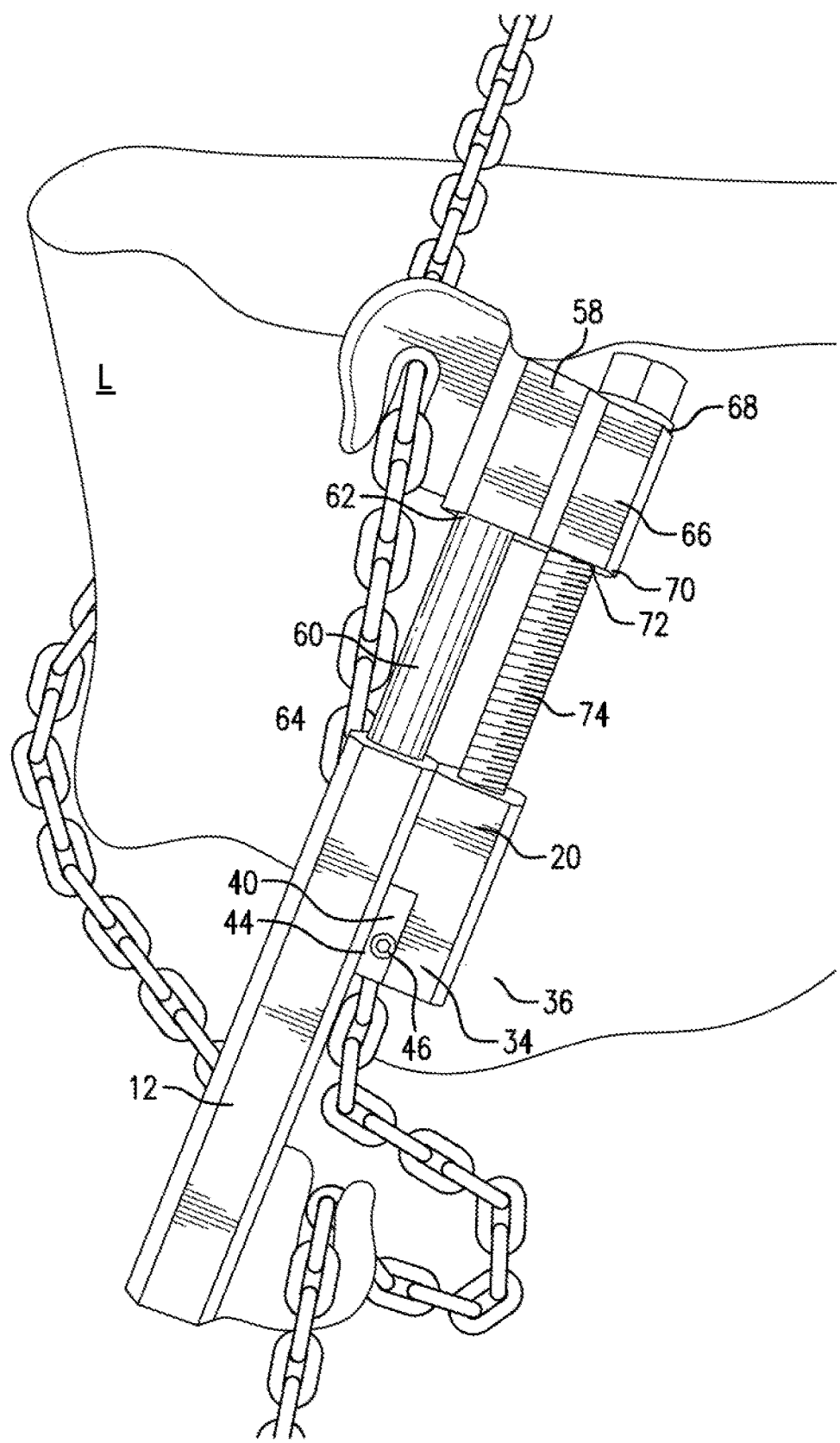
FIG. 2 shows aside view of a first embodiment coupled to a chain, in an extended position.
Figure 3:
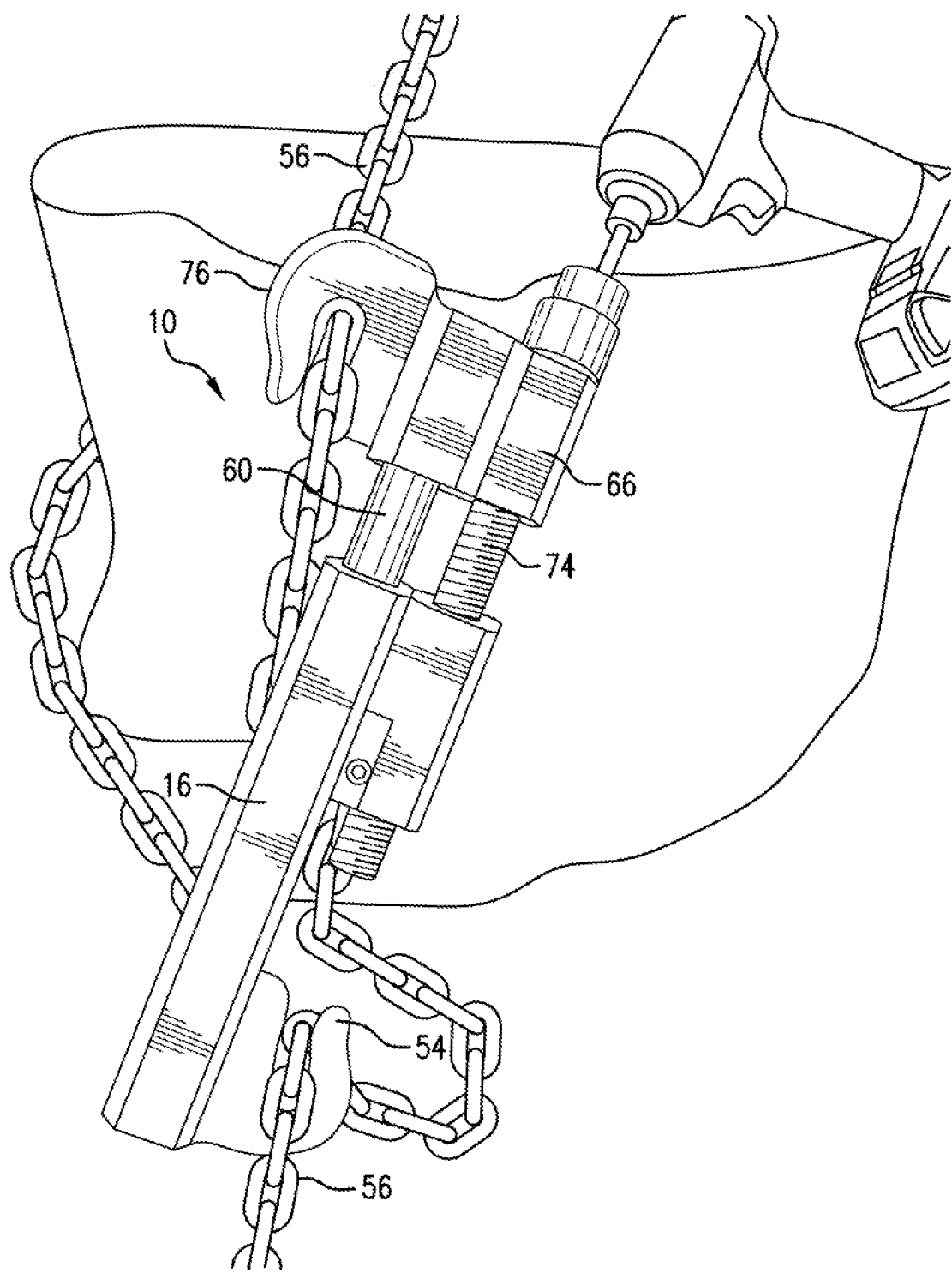
FIG. 3 shows a side view of a first embodiment coupled to a chain, in use with a powered operator, in a tightened position.

Referring to FIGS. 1-3, a first embodiment of a load binder 10 is shown. The first embodiment 10 includes a first part 12 and a second part 14 movably engageable to first part 12.

In the embodiment, load binder first part 12 includes a receiver portion 16 and a threaded coupler portion 18 rigidly connected to receiver portion 16. Threaded coupler portion 18 includes a first journal bearing 20 rigidly mounted to receiver portion 16, the first journal bearing 20 extending from a first end 22 to a second end 24 with an interior race 26 (not visible) extending from first end 22 to second end 24. A nut retainer 28 is connected to journal bearing 20 proximate the journal bearing second end 24, and extending therefrom. Nut retainer 28 is configured to receive a selected threaded nut 30 (not visible). Threaded nut 30 engages threaded bolt 74 to selectively retract load binder first part 12 relative to load binder second part 14. In the embodiment, threaded nut 30 is a hex nut and bolt 74 is ⅝ inch thread size. Nut retainer 28 comprises a hollow metal sheath having at least two opposed flat sidewalls to hold nut 30 in place and prevent nut 30 from rotating. In the embodiment, nut retainer 28 includes first and second opposed sidewalls 32 and 34, and a third enclosing sidewall 36 extending between and connecting first and second sidewalls 32 and 34. First and second opposed compression flanges 38 and 40 extend from first and second sidewalls 32 and 34, with opposed apertures 42 and 44 to receive a compression member 46. In the embodiment, compression member 46 is a threaded nut and bolt set. When tightened, compression member 46 draws together first and second compression flanges 38 and 40, thereby compressing first and second sidewalls 34 and 34 against nut 30 to prevent rotational or lateral displacement of nut 30 during use.

In the embodiment, load binder first part receiver portion 16 is an elongated steel tube extending from a first end 48 to a second end 50, defining an interior receiver race 52 (not visible) therein. Interior receiver race 52 has a cross-section of adequate size and shape to slidingly receive load binder second part guide rod 60 therein.

Load binder first part 12 includes a selectively engageable first chain/cable coupler 54 mounted proximate load binder first part receiver portion 16 second end 50. First chain/cable coupler 54 is configured to selectively engage to and disengage from the chain/cable/strap 56 used to secure the load L.

Load binder second part 14 includes a head portion 58, a guide rod 60 extending from a first end 62 connected to head portion 58 to a second end 64, and bolt receiver 66 rigidly mounted alongside head portion 58. In the embodiment, bolt receiver 66 comprises a rigid steel tube extending from a first end 68 to a second end 70 and defining an interior chase 72 (not visible) extending therebetween. A second selectively engageable chain/cable coupler 76 is connected to head portion 58. In the embodiment, second chain/cable coupler 76 is mounted in an opposed orientation to first chain/cable coupler 54 to provide greater clearance.

In operation, load binder 10 is expanded by rotating threaded bolt 74 counter-clockwise against threaded nut 30 to drive load binder first and second parts 112 and 114 apart. Second part guide rod 60 sliding within first part receiver portion 16 maintains alignment and reduces torque forces on threaded bolt 74 and nut 30. Chain 56 is positioned across the load, and links are inserted into first and second chain/cable couplers 54 and 76 to engage chain 56. Threaded bolt 74 is then rotated clockwise to selectively tighten. Load binder 10 may be tightened to any tension level desired (within the strength limits of the material), and the threaded bolt 74 and opposed orientations of chain couplers 54 and 76 allow the operator to use an impact wrench or other motorized wrench, as well as a manual wrench, which significantly improves safety and operability. Ability to use motorized devices for tightening allows truck drivers with injuries or disabilities, or limited strength, to safely secure loads without assistance.

Figure 4:
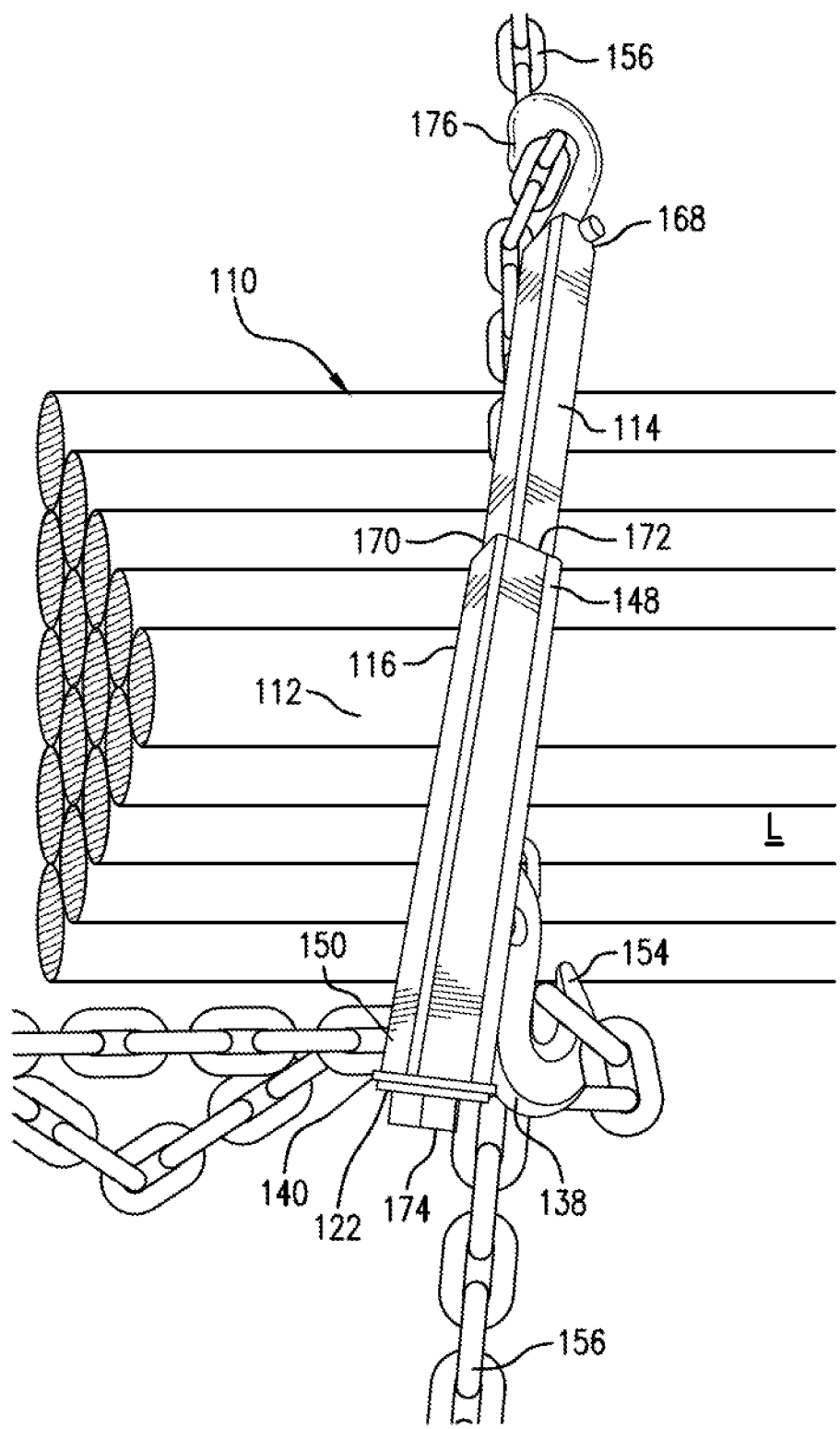
FIG. 4 shows a side view of a second embodiment in coupled to a chain in an extended position.
Figure 5:
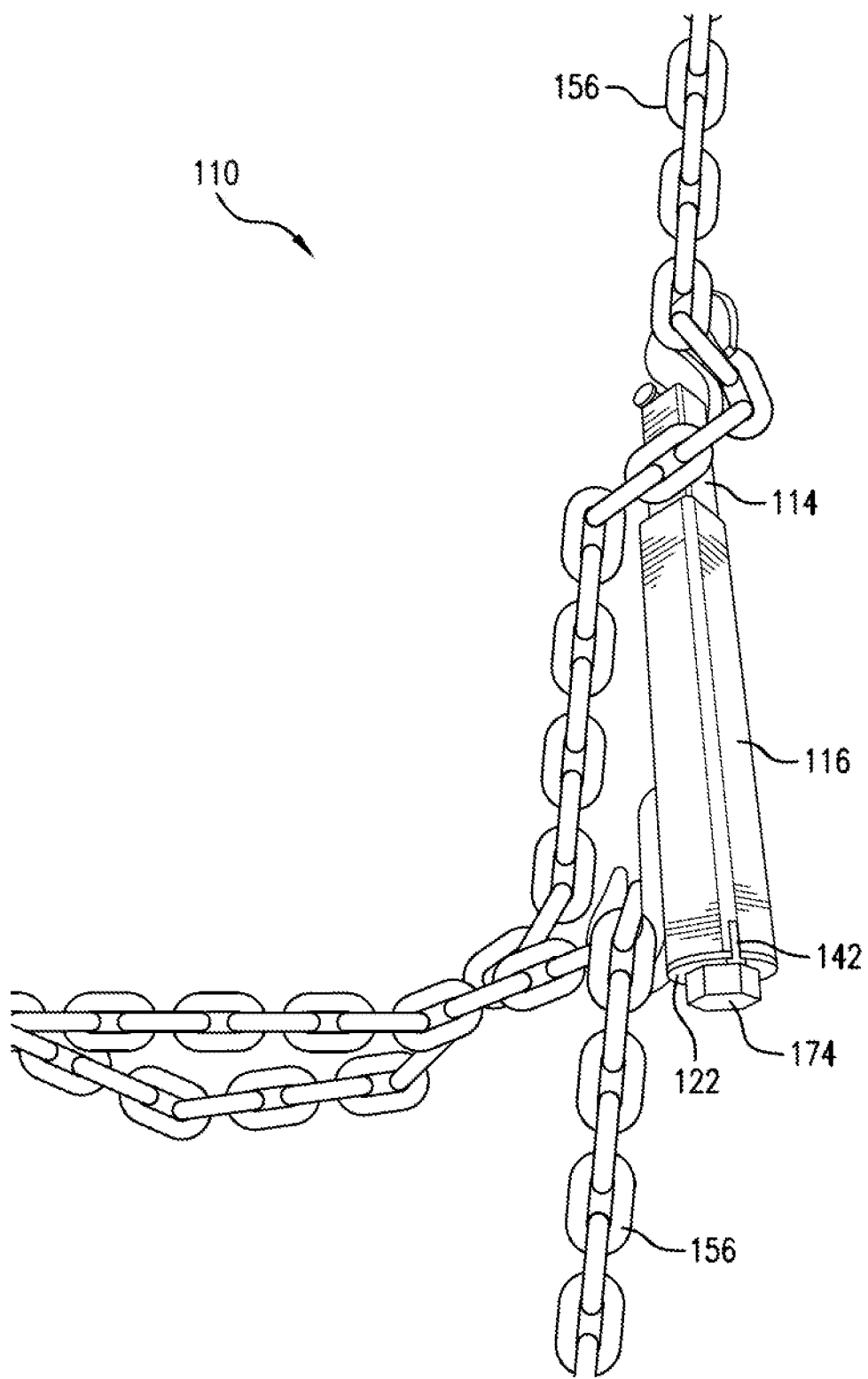
FIG. 5 shows a side view of a second embodiment in coupled to a chain in a tightened position.

Referring to FIGS. 4-5, a second embodiment 110 is shown. The second described embodiment 110 includes a load binder first part 112 and a load binder second part 114 movably coupled to first part 112.

Load binder first part 112 includes a receiver portion 116 which slidingly engages load binder second part 114 and extends from a first end 148 to a second end 150. Load binder second part 114 extends from a first end 168 to second end 170 and includes a threaded aperture 130 (not visible) at second end 170. Receiver portion 116 is a hollow tube having an interior chase 172 and includes a round end flange 122, and first opposed first, second and third retainers 138, 140 and 142. Retainers 138, 140 and 142 retain end flange 122 in place against axial forces. In the embodiment, end flange 122 comprises a round flat portion welded to receiver portion second end 150 and including an aperture 120, which also acts as a journal bearing for threaded bolt 174. Threaded bolt 174 extends through end flange 122 and receiver portion 116 via aperture/journal bearing 120 to engage load binder second part 114 second end 170 via threaded coupling 130 (not visible).

Load binder first part includes a first chain/cable coupler 154 rigidly connected proximate first part second end 150. Load binder second part includes a second chain/cable coupler 176 rigidly connected proximate second part second end 170. In the embodiment, first and second chain/cable couplers 154 and 176 are oriented in opposed directions. The rectangular cross sections of receiver portion 116 and load binder second part 114 maintain the selected orientation of couplers 154 and 176. First and second chain/cable couplers 154 and 176 selectively engage chain/cable 156 to retain load L Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A load binding apparatus comprising:
   a load binder first part, a load binder second part slindingly engageable with the load binder first part, and a tie bolt;
   the load binder first part including a receiver portion, a threaded coupler portion rigidly connected to and parallel with the receiver portion, and a first chain coupler;
      the threaded coupler portion including a first journal bearing rigidly mounted to and parallel with the receiver portion, the first journal bearing extending from a first end to a second end with an interior race extending from first end to second end, and a nut retainer connected to the first journal bearing proximate the first journal bearing second end aligned with the journal bearing interior race and extending therefrom, the nut retainer configured to releasably and nonrotationally receive a selected threaded nut adapted to engage the threaded bolt;
   the load binder second part including a head portion, a guide rod, a bolt receiver, and a chain coupler, the guide rod extending from a guide rod first end rigidly connected to head portion to a guide rod second end, and the bolt receiver rigidly mounted along a lateral side of head portion, bolt receiver including a second journal bearing aligned with and parallel to the first journal bearing, and the second chain coupler rigidly connected to the head portion along an opposite lateral side from the bolt receiver;
   the tie bolt extending through the second journal bearing, the first journal bearing and engaging the threaded nut within the nut retainer.

2. The apparatus of claim 1, further comprising:
   a chain, the chain having a length selected to wrap over a selected load disposed on a carrier, the chain selectively engageable to the first and second chain couplers.

3. A load binding apparatus, comprising:
   a load binder first part, a load binder second part slindingly engageable with the load binder first part, and a tie bolt;
   the load binder first part including a receiver portion comprising a first hollow tube defining an receiver interior chase which extends from a load binder first part first end to a load binder first part second end and slidingly engages within load binder second part, a round end flange disposed at the load binder first part first end and having an aperture therethrough to receive the tie bolt, a plurality of end flange retainers disposed around and engaged with the end flange, and a first chain coupler rigidly connected to a lateral exterior portion of load binder first part proximate load binder first part second end;
   the load binder second part extending from a load binder second part first end to load binder second part second end and including a load binder second part interior chase and a threaded aperture extending from the interior chase through the load binder second part second end, and further including a second chain coupler rigidly connected proximate the load binder second part second end; and,
   wherein the tie bolt extends through the load binder first part end flange and receiver portion interior chase to engage the load binder second part second end threaded aperture.

4. The apparatus of claim 2, further comprising:
   a chain, the chain having a length selected to wrap over a selected load disposed on a carrier, the chain selectively engageable to the first and second chain couplers.

5. The apparatus of claim 1, further comprising:
   wherein the cross sections of the load binder first part receiver portion and the load binder second part are rectilinear.

6. The apparatus of claim 3, further comprising:
   wherein the cross sections of the load binder first part and load binder second part are rectilinear.

* * * * *